United States Patent
Wu et al.

(10) Patent No.: US 8,826,226 B2
(45) Date of Patent: Sep. 2, 2014

(54) CUSTOM LANGUAGE MODELS

(75) Inventors: Jun Wu, Saratoga, CA (US); Henry Ou, Beijing (CN); Xiliu Tang, Beijing (CN); Yong-Gang Wang, Beijing (CN); Yongyan Liu, Beijing (CN)

(73) Assignee: Google Inc., Mountain View, CA (US)

( * ) Notice: Subject to any disclaimer, the term of this patent is extended or adjusted under 35 U.S.C. 154(b) by 565 days.

(21) Appl. No.: 13/127,417

(22) PCT Filed: Nov. 5, 2008

(86) PCT No.: PCT/CN2008/001845
§ 371 (c)(1),
(2), (4) Date: Aug. 11, 2011

(87) PCT Pub. No.: WO2010/051654
PCT Pub. Date: May 14, 2010

(65) Prior Publication Data
US 2011/0296374 A1 Dec. 1, 2011

(51) Int. Cl.
*G06F 9/44* (2006.01)
*G06F 7/00* (2006.01)
*G10L 15/00* (2013.01)
*G06F 17/27* (2006.01)

(52) U.S. Cl.
CPC .................. *G06F 17/2715* (2013.01)
USPC ............ 717/104; 704/231; 704/240; 707/738

(58) Field of Classification Search
CPC .................... G06F 17/30864; G06F 17/30867; G06F 17/3053; G06F 17/30675; G06F 17/30616; G06F 17/3069; G06F 17/30705; G06F 17/30687; G06F 17/30663
See application file for complete search history.

(56) References Cited

U.S. PATENT DOCUMENTS

| | | | | |
|---|---|---|---|---|
| 5,828,999 | A * | 10/1998 | Bellegarda et al. | 704/240 |
| 7,283,997 | B1 * | 10/2007 | Howard et al. | 1/1 |
| 7,418,386 | B2 * | 8/2008 | Lai et al. | 704/257 |
| 7,779,349 | B2 * | 8/2010 | Spangler | 715/234 |

(Continued)

FOREIGN PATENT DOCUMENTS

| | | |
|---|---|---|
| CN | 101055585 | 10/2007 |
| JP | 2001134285 A | 5/2001 |

(Continued)

OTHER PUBLICATIONS

Hilda Hardy et al.; Cross-Document Summarization by Concept Classification; 2002 ACM; pp. 121-128; <http://dl.acm.org/citation.cfm?id=564399>.*

(Continued)

*Primary Examiner* — Thuy Dao
*Assistant Examiner* — Cuong V Luu
(74) *Attorney, Agent, or Firm* — Remarck Law Group PLC (57) ABSTRACT

Systems, methods, and apparatuses including computer program products for generating a custom language model. In one implementation, a method is provided. The method includes receiving a collection of documents; clustering the documents into one or more clusters; generating a cluster vector for each cluster of the one or more clusters; generating a target vector associated with a target profile; comparing the target vector with each of the cluster vectors; selecting one or more of the one or more clusters based on the comparison; and generating a language model using documents from the one or more selected clusters.

14 Claims, 7 Drawing Sheets

(56) References Cited

U.S. PATENT DOCUMENTS

| | | | |
|---|---|---|---|
| 7,856,350 B2* | 12/2010 | Zhou et al. | 707/738 |
| 2002/0128831 A1* | 9/2002 | Ju et al. | 704/231 |
| 2005/0216265 A1* | 9/2005 | Chelba et al. | 704/240 |
| 2006/0053015 A1* | 3/2006 | Lai et al. | 704/257 |
| 2008/0215314 A1* | 9/2008 | Spangler | 704/10 |
| 2009/0157652 A1* | 6/2009 | Barbosa et al. | 707/5 |
| 2009/0299822 A1* | 12/2009 | Harari et al. | 705/10 |
| 2011/0239183 A1* | 9/2011 | Paradkar et al. | 717/104 |
| 2012/0110545 A1* | 5/2012 | Jerman et al. | 717/104 |
| 2014/0033168 A1* | 1/2014 | Solovey et al. | 717/104 |
| 2014/0059514 A1* | 2/2014 | Hosmer | 717/104 |

FOREIGN PATENT DOCUMENTS

| | | |
|---|---|---|
| JP | 2002510076 A | 4/2002 |
| JP | 2002268678 | 9/2002 |
| JP | 2003255985 A | 9/2003 |
| JP | 2004109906 A | 4/2004 |
| JP | 2008226104 A | 9/2008 |
| WO | 9950830 A | 10/1999 |

OTHER PUBLICATIONS

Trevor Strohman et al.; Indri A language-model based search engine for complex queries; 2005 Citeseer; 6 pages; <http://citeseerx.ist.psu.edu/viewdoc/download?doi=10.1.1.65.3502&rep=rep1&type=pdf>.*

Ian Foster et al.; Chimera A Virtual Data System for Representing, Querying, and Automating Data Derivation; 2002 IEEE; 10 pages; <http://ieeexplore.ieee.org/stamp/stamp.jsp?tp=&arnumber=1029704>.*

Oren Zamir et al.; Web Document Clustering a Feasibility Demonstration ; 1998 ACM; pp. 46-54; <http://dl.acm.org/citation.cfm?id=290956>.*

Michael Droettboom et al.; The Gamera framework for building custom recognition systems ; 2003 Gamera; 12 pages; <http://gamera.informatik.hsnr.de/publications/droettboom_gamera_03.pdf>.*

C. G. Wolf et al.; Summarizing technical support documents for search Expert and user studies; 2004 IBM systems journal; pp. 564-586; <http://ieeexplore.ieee.org/stamp/stamp.jsp?tp=&arnumber=5386755>.*

* cited by examiner

CUSTOM LANGUAGE MODELS

BACKGROUND

This specification relates to language models.

Language models are used to model a probability that a string of tokens (e.g., words or characters) in a given vocabulary will appear in a language. For example, language models are used in input methods, such as, but not limited to input method editor (IME), automatic speech recognition (ASR), machine translation, handwriting recognition, and optical character recognition (OCR) applications. Modeling the probability for a string of tokens in the vocabulary is typically performed using a chain rule and calculating the probability of a given token w, in a given string context, p(w|context), where the context is the tokens in the string preceding the given token, w.

In an n-gram language model, n consecutive tokens in text are formed into n-grams, and the probability of a current word z, for example, depends on probabilities of n-1 preceding words, e.g., $p(z_i|context)=p(z_i|z_{i-n+1}, Z_{i-n+2}, \ldots Z_{i-1})$. An n-gram has an order, which is the number of tokens in the n-gram. For example, a 1-gram (or unigram) includes one token; a 2-gram (or bi-gram) includes two tokens.

The probabilistic distribution of n-grams in text (e.g., words in a sentence) largely depends on context, which can also be viewed in a more general sense. For example, the probabilistic distribution of particular n-grams in text can depend on a topic to be expressed by the text, or a domain that the text occurs. The probability of "basketball" occurring in a sports article is greater than the probability of "basketball" occurring in a financial article. In addition, different users may use (e.g., favor) different words, for example, to express the same idea. Users in Spain may use "football", while users in the United States may use "soccer". Therefore, the probabilistic distribution of n-grams in text can be both user-dependent and domain-dependent.

Conventional input methods use general language models. For example, a single language model may be used for all users. As another example, the same language model may be used or generated from training data for all domains (e.g., domains of a computer system, geographical domains). A general language model may not be optimized for all input method uses.

SUMMARY

This specification describes technologies relating to custom language models.

In general, one aspect of the subject matter described in this specification can be embodied in methods that include the actions of receiving a collection of documents; clustering the documents into one or more clusters; generating a cluster vector for each cluster of the one or more clusters; generating a target vector associated with a target profile; comparing the target vector with each of the cluster vectors; selecting one or more of the one or more clusters based on the comparison; and generating a language model using documents from the one or more selected clusters. Other embodiments of this aspect include corresponding systems, apparatus, and computer program products.

These and other embodiments can optionally include one or more of the following features. Generating a language model includes identifying a collection of n-grams from the documents from the one or more selected clusters. Each n-gram has a corresponding relative frequency of occurring in the documents from the one or more selected clusters. Each cluster is associated with a topic or domain. Each cluster vector represents a centroid for a corresponding cluster. Clustering the documents includes randomly assigning each document to a cluster, and iteratively calculating a centroid for each cluster and reassigning each document to a cluster based on a nearest centroid, until convergence. The target vector includes a term frequency vector. The target vector is generated from at least one of a user dictionary or user input. The comparing includes calculating a cosine similarity between the target vector and each of the cluster vectors. The method further includes receiving one or more additional documents, and updating the language model based on the one or more additional documents.

In general, another aspect of the subject matter described in this specification can be embodied in methods that include the actions of receiving a collection of documents; clustering the documents into one or more generic clusters; generating a cluster vector for each cluster of the one or more generic clusters; generating a target vector associated with a target profile; comparing the target vector with each of the cluster vectors; and selecting one or more of the one or more generic clusters based on the comparison. Other embodiments of this aspect include corresponding systems, apparatus, and computer program products.

These and other embodiments can optionally include one or more of the following features. The method further includes generating a language model using documents from the one or more selected generic clusters.

In general, another aspect of the subject matter described in this specification can be embodied in methods that include the actions of receiving a user input identifying the user; identifying a user profile corresponding to the user; using the identified profile to generate a user specific language model; and sending the user specific language model to a first client. Other embodiments of this aspect include corresponding systems, apparatus, and computer program products.

These and other embodiments can optionally include one or more of the following features. The method further includes sending the user specific language model to a second client. The method further includes receiving a collection of documents, clustering the documents into one or more clusters, generating a cluster vector for each cluster of the one or more clusters, generating a target vector associated with the user profile, comparing the target vector with each of the cluster vectors, and selecting one or more of the one or more clusters based on the comparison. Generating a user specific language model includes identifying a collection of n-grams from the documents from the one or more selected clusters. Each n-gram has a corresponding relative frequency of occurring in the documents from the one or more selected clusters.

In general, another aspect of the subject matter described in this specification can be embodied in methods that include the actions of receiving a first collection of one or more documents; generating a profile based on the first collection of one or more documents; receiving a second collection of one or more documents; generating a custom language model based on the second collection of one or more documents and the profile; and sending the custom language model to a client. Other embodiments of this aspect include corresponding systems, apparatus, and computer program products.

These and other embodiments can optionally include one or more of the following features. The first collection of one or more documents includes at least one of a user dictionary or user input representing the user's input behavior.

Particular embodiments of the subject matter described in this specification can be implemented to realize one or more of the following advantages. Unsupervised classification of training data into subsets can (i) increase the amount of data (e.g., the size of a corpus) that can be considered for training a custom language model; and (ii) reduce the amount of user intervention, thereby reducing user error.

A custom language model can be generated for specific input method uses (e.g., for particular users and domains) to increase the accuracy, precision, and recall of the input method, thereby reducing an input error rate. In addition, a custom language model can adapt to a user's behavior (e.g., be generated/refined based on documents input by the user that represent the user's behavior, or a user dictionary), thereby further increasing accuracy, precision, and recall, and reducing the input error rate. Furthermore, custom language models can be topic-dependent and adaptive to a topic of a user's current input. For example, a user may select from a plurality of custom language models of different topics, that are stored on a server, based on a topic of interest. Because a custom language model can be trained from a subset of all the available training data, the custom language model can have a smaller memory size than a general language model. As a result, use of the custom language model reduces (i) the memory footprint of an input method that uses the custom language model; (ii) the amount of memory used to store the custom language model; and (iii) the amount of bandwidth/time required to provide the custom language model to a user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
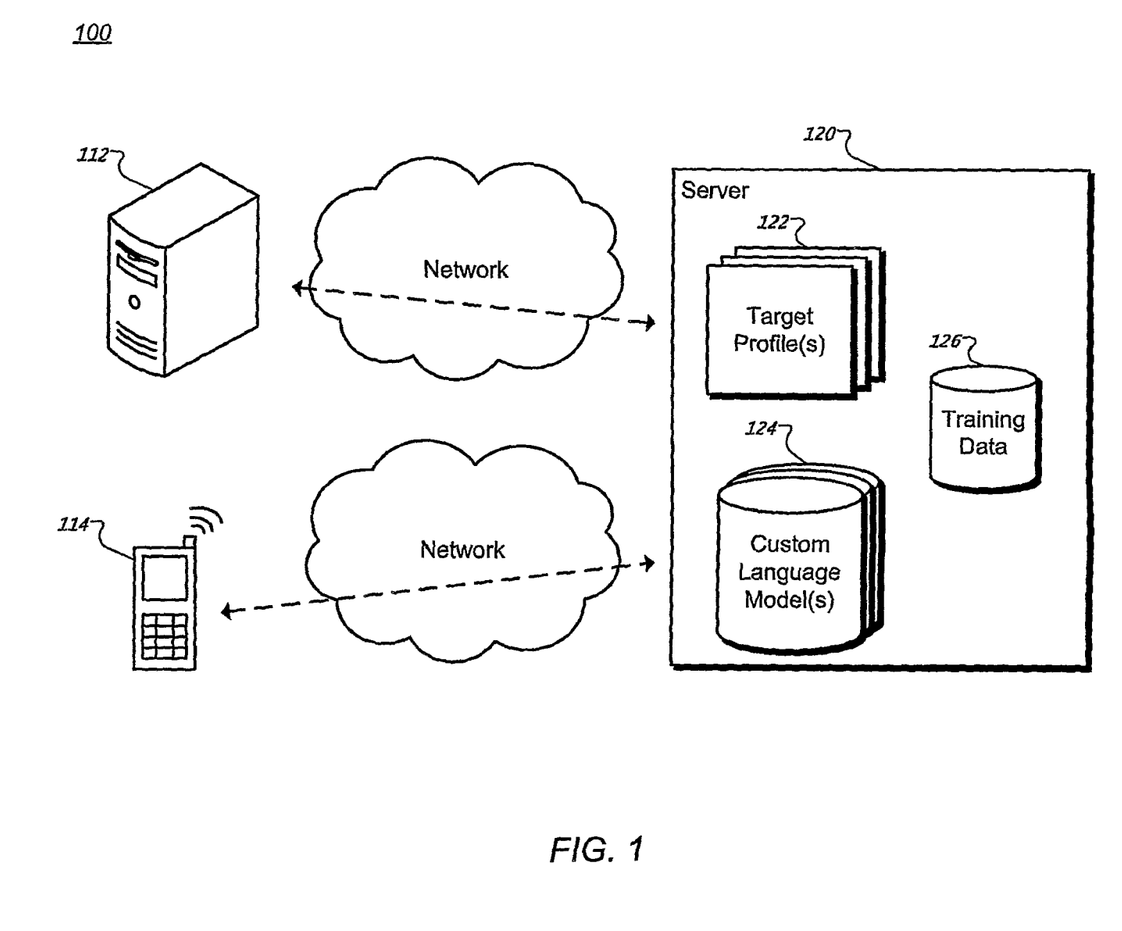
FIG. 1 is a diagram illustrating an example system for generating custom language models.

FIG. 1 is a diagram illustrating an example system 100 for generating custom language models 124. The system 100 includes a first client 112 (e.g., a desktop computer), a second client 114 (e.g., a cellular telephone), and a server 120. The server 120 can include target profile(s) 122, custom language model(s) 124, and training data 126 (e.g., an unannotated corpus).

As an overview of generating custom language models, the training data 126 can be classified into collections of the training data 126 (e.g., one or more collections of documents). The server 120 can receive a user input that identifies the user (e.g., a first user on the first client 112, a second user on the first client 112, the first user on the second client 114). For example, the server 120 can use a user login or a cookie to identify the user. The server 120 can generate a target profile 122 (e.g., user profile) that corresponds to each user.

In some implementations, the target profile 122 can be predetermined. For example, the server 120 can identify a target profile 122, corresponding to the user, that was previously generated. In some implementations, the target profile 122 can be generated based on a dictionary of the user or user input (e.g., data provided by the user that represents the user's input behavior). Furthermore, the target profile 122 can be automatically or manually synchronized between the server 120 and a client (e.g., the first client 112). The target profile 122 can be compared to profiles of each of the subsets of the training data 126. One or more of subsets of the training data 126 can be selected based on a similarity, for example, between the target profile 122 and the profile of each subset.

The selected subsets of training data 126 can be used to generate a custom language model 124 (e.g., a user specific language model, a domain specific language model). The custom language model can be sent through a network, for example, to the first client 112. The first client 112 can use the custom language model for input methods used by the user. In some implementations, a copy of the custom language model is stored on the server 120. If the user uses an input method on the second client 114, for example, the copy of the custom language model can be sent to (and/or updated on) the second client 114.

In some implementations, the target profile(s) 122, custom language model(s) 124, and/or training data 126 are stored on a plurality of servers, or other locations. For example, the training data 126 can include any documents that can be accessed by the server 120. In particular, the training data 126, can include, but is not limited to, input method editor (IME) user inputs, IME user dictionaries, web pages, search query logs, emails, blogs, instant message (IM) scripts, and news articles, can be used to train a custom language model 124.

Generating a Target Profile

A target profile 122 can be generated for each user (or domain). In some implementations, the target profile 122 is generated for an identified user. For example, the user can identify himself/herself by providing login information, and a target profile 122 can be generated based on data associated with the user, e.g., a user dictionary associated with the identified user. A user dictionary can include predefined words from an IME and/or from user input, for example. In addition, a user dictionary can include statistics associated with word usage, for example, word counts or frequencies in a user's input history (e.g., chat text, search queries). Other statistical data, such as n-grams that occurred in user input, can also be stored in the target profile 122. In some implementations, a target profile 122 is generated for the user based on data that the user provides. For example, a user can submit documents representing his/her input behavior, and a target profile 122 can be generated based on the submitted documents. In some implementations, the target profile 122 is stored on the server 120 (or client) and reused.

The target profile 122 can represent the relative importance of particular tokens to the user. In some implementations, the target profile 122 is represented using a vector. For example, a feature vector can include one or more features (e.g., terms) and a corresponding term frequency (tf) weight for each feature. The tf weights can be used as statistical measures of the importance of a feature to the user. For example, the importance of a feature to the user can increase proportionally according to the frequency that the feature occurs (e.g., a term frequency) in a collection of documents input by the user, or the user's dictionary.

The term frequency in a document is a relative frequency that a particular term occurs in the document, and can be represented as:

$$tf_{i,j} = \frac{n_{i,j}}{\sum_k n_{k,j}},$$

where the term frequency is a number $n_{i,j}$ of occurrences of the particular term in a document ($d_j$) divided by the number of occurrences of all terms in $d_j$.

In some implementations, tf-idf weights are used as the statistical measures of the importance of the features to the user. A tf-idf weight can be calculated by multiplying a term frequency with an inverse document frequency (idf).

The inverse document frequency (idf) can be represented as:

$$idf_i = \log \frac{|D|}{|D_j : t_i \in d_j|},$$

where the number D of all documents in the collection of documents is divided by a number $D_j$ of documents $d_j$ containing the term $t_i$. In some implementations, the Napierian logarithm is used instead of the logarithm of base 10.

A tdf-idf weight can be represented as:

$tf\_idf_{i,j} = tf_{i,j} \cdot idf_{i,j}.$

The target profile 122 can be compared to profiles (e.g., feature vectors) of subsets of training data 126 to determine the subsets of the training data 126 used to train the custom language model 124.

Classifying Training Data

The training data 126 can be classified into subsets using various classification methods. In some implementations, clustering is used to classify the training data 126 into subsets. For example, partitional clustering (e.g., k-means clustering, locality sensitive hashing, graph-theoretic methods) or hierarchical clustering (e.g., agglomerative hierarchical clustering, concept clustering) can be used to classify the training data 126. As other examples, documents can be correlated to clusters using singular value decomposition (SVD), latent semantic analysis (LSA), and neural networks. Other implementations are possible. For example, quadratic classifiers or a k-nearest neighbor algorithm can be used to classify the training data 126 into subsets.

Figure 2:
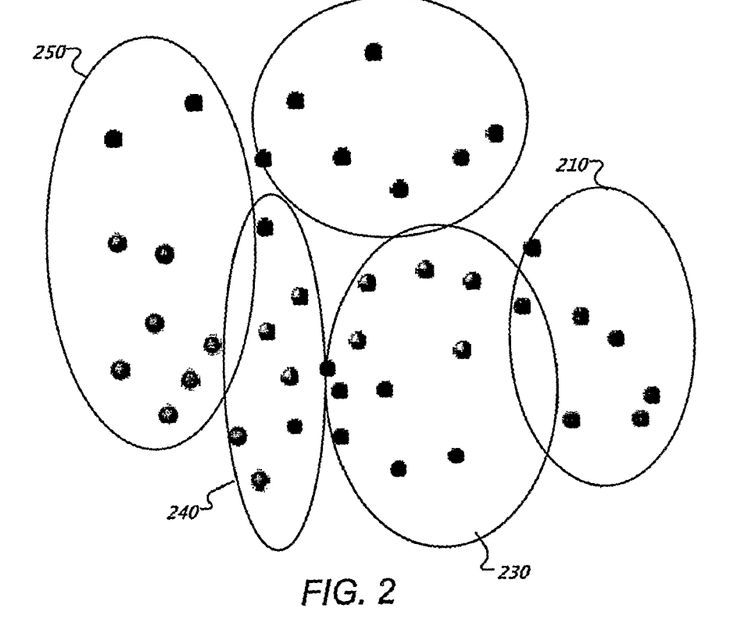
FIG. 2 is a diagram that includes example clusters of documents.

FIG. 2 is a diagram that includes example clusters (210, 220, 230, 240, and 250) of documents. The documents are represented by dots in FIG. 2. A k-means clustering technique can be used to generate the clusters. In particular, a number of clusters k can be selected. For example, five clusters (k=5) are shown FIG. 2. The clusters 210, 220, 230, 240, and 250 can be randomly generated. In particular, each document can be randomly assigned to a cluster. In some implementations, a document can be initially assigned to more than one cluster. A centroid (or cluster center) can be determined for each of the clusters 210, 220, 230, 240, and 250, as described below.

Figure 3:
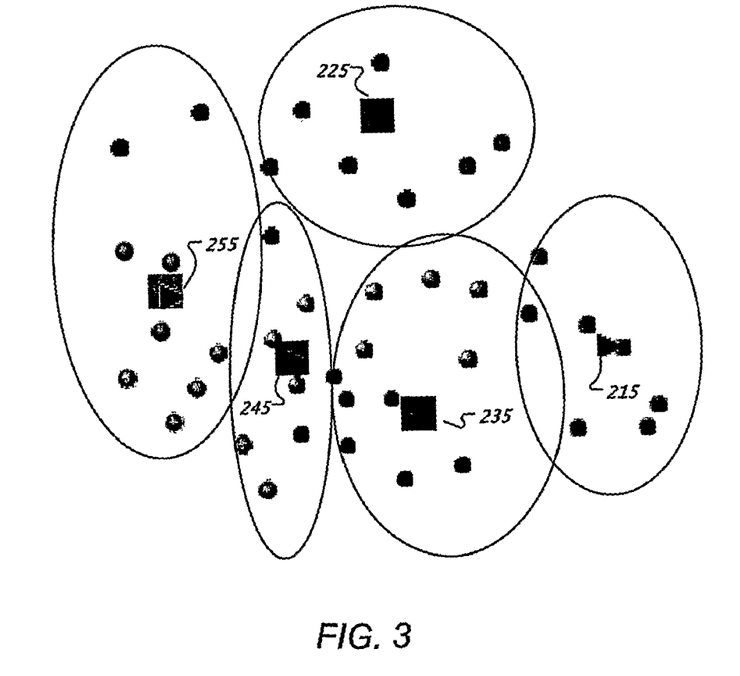
FIG. 3 is a diagram that includes the example clusters of FIG. 2 and corresponding centroids.

FIG. 3 is a diagram that includes the example clusters of FIG. 2 and corresponding centroids (215, 225, 235, 245, and 255). In some implementations, a cluster's centroid is determined by calculating a tf-idf (term frequency-inverse document frequency) vector for each of the documents in the cluster. The tf-idf vector can include features and their corresponding feature weights (e.g., tf-idf weights). A cluster's centroid can be represented by the average of all of the tf-idf vectors that correspond to documents in the cluster. The tf-idf weights can be calculated in the manner described previously.

As an example, a particular document (e.g., a dot in cluster 250 of FIG. 3) may contain 5,000 words. In the document, the word "basketball" may occur 200 times. The term frequency for "basketball" would be 0.04 (200/5,000). The collection of documents in cluster 250 (e.g., all of the dots in cluster 250) includes nine documents. Assuming "basketball" appears in only one of the nine documents, the inverse document frequency is $\log(9/1) \approx 0.95$. The tf-idf vector for that document can include the feature "basketball" and a corresponding tf-idf weight of $(0.04 \cdot 0.95) \approx 0.04$. Additional features and weights can be generated for additional terms in the documents of a particular cluster, using similar calculations.

The centroid of the cluster can be calculated as the average of the tf-idf vectors for all of the documents in the cluster. For example, for a cluster with two documents X and Y that each have tf-idf vectors, each including three features, the documents X and Y can be represented by: $X=(x_1, x_2, x_3)$ and $Y=(y_1, y_2, y_3)$, respectively. The centroid Z of the cluster can be represented by: $Z=(z_1, z_2, z_3)$, where $z_1=(x_1+y_1)/2$; $z_2=(x_2+y_2)/2$; and $z_3=(x_3+y_3)/2$.

Figure 4:
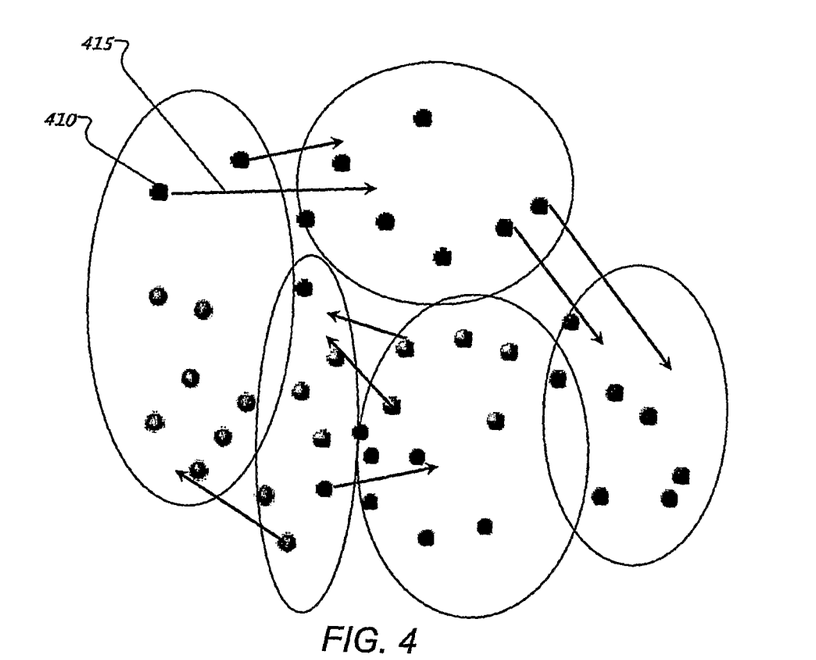
FIG. 4 is a diagram illustrating an example reclassification of some of the documents of FIG. 2.

After the centroids are calculated for the initial clusters, each document is reassigned to the nearest centroid. FIG. 4 is a diagram illustrating an example reclassification of some of the documents of FIG. 2. In particular, FIG. 4 shows some of the documents being reassigned to a different cluster based on a corresponding nearest centroid. For example, document 410 in cluster 250 can be reassigned to cluster 220, as shown by arrow 415. A nearest centroid can be determined by calculating the distance between a document and each of the clusters' centroid. In particular, the distance between the td-idf vector representing the document and the td-idf vector representing each centroid can be calculated. Returning to the previous example, the distance between centroid Z and document X can be represented as a cosine distance:

$$\text{cosine distance} = \frac{X \cdot Z}{\|X\| \cdot \|Z\|} = \frac{x_1 \cdot z_1 + x_2 \cdot z_2 + x_3 \cdot z_3}{\sqrt{x_1^2 + x_2^2 + x_3^2} \cdot \sqrt{z_1^2 + z_2^2 + z_3^2}}.$$

The document can be assigned to the cluster that is the least distant from the document. After each of the documents are reassigned to its nearest centroid, new centroids can be calculated.

Figure 5:
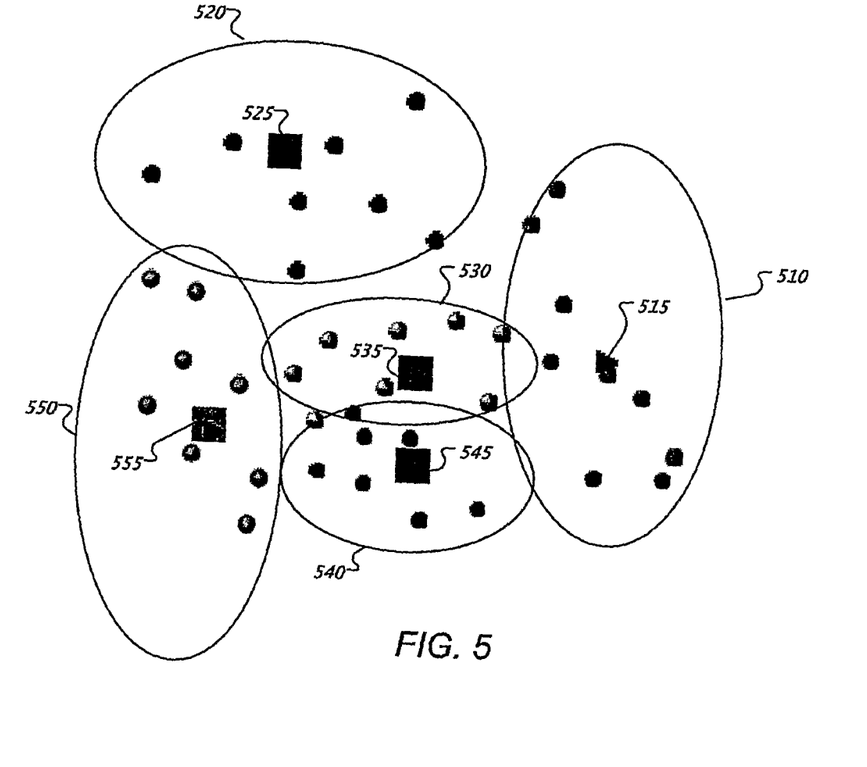
FIG. 5 is a diagram illustrating an example readjustment of the example clusters based on the reclassification in FIG. 4.

FIG. 5 is a diagram illustrating an example readjustment of the example clusters 510, 520, 530, 540, and 550 based on the reclassification in FIG. 4. The new centroids can be determined, as previously described with respect to FIGS. 2 and 3.

In particular, centroids 515, 525, 535, 545, and 555 can be determined for clusters 510, 520, 530, 540, and 550, respectively.

Multiple iterations of reclassifying the documents based on nearest centroids, and readjusting the clusters based on the reclassification can be performed until one or more criteria are met. For example, the reclassifications and readjustments can be performed until a convergence criterion is met (e.g., no documents are reassigned).

Figure 6:
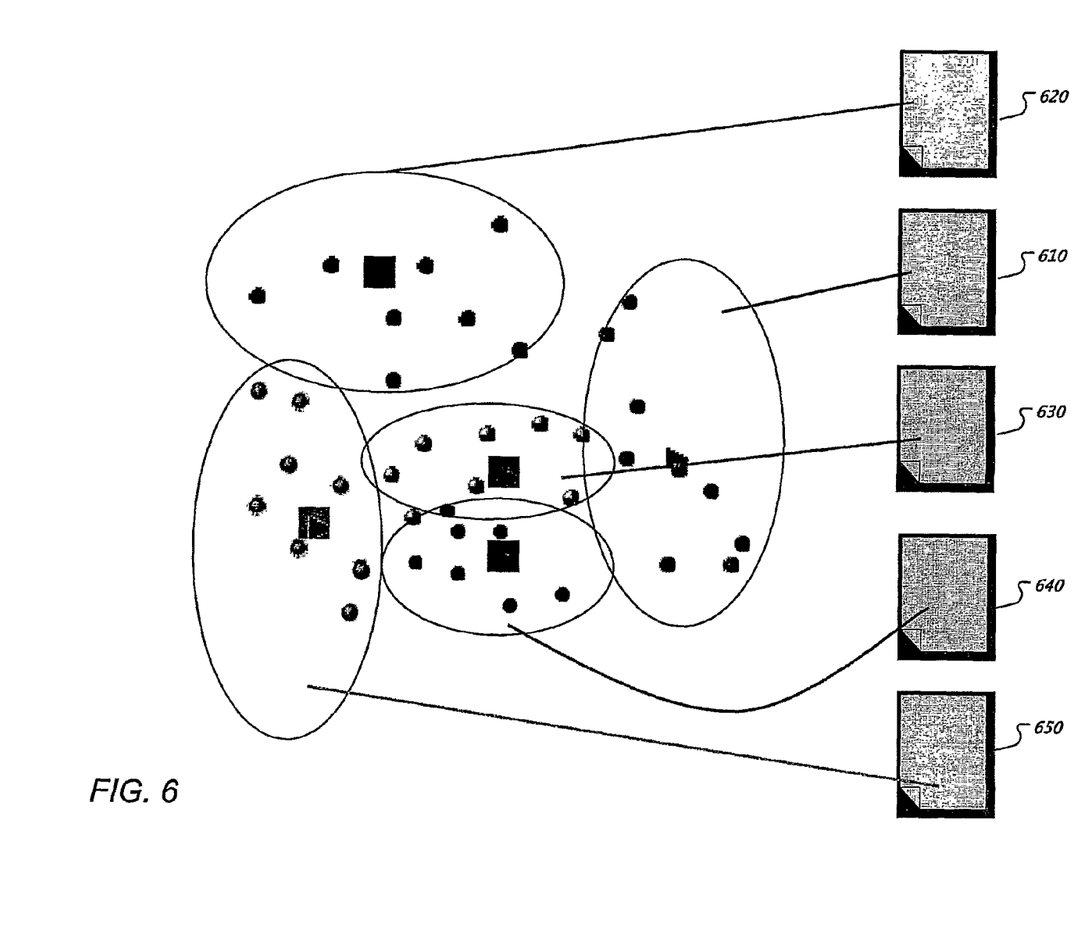
FIG. 6 is a diagram illustrating an example generation of profiles for each of the example clusters of FIG. 5.

After classification is complete, profiles for each of the clusters can be generated. FIG. 6 is a diagram illustrating an example generation of profiles 610, 620, 630, 640, and 650 for each of the example clusters 510, 520, 530, 540, and 550 of FIG. 5. For example, the profiles can be represented by td-idf vectors that are calculated (as described above) for each of the clusters according to the documents in the respective clusters.

Because the resulting clusters depend on the initial random assignments of the documents to each cluster, in some implementations, the process described above is repeated to create additional clusters from the training data 126.

Furthermore, because of the way the subsets of training data 126 are generated, a topic or domain does not have to be predetermined for each subset of training data. For example, the clusters that are generated can be considered generic clusters. In particular, each cluster is not initially created to represent any particular topic/domain, but each cluster can inherently represent a topic or domain as a result of the clustering of similar documents. As a result, topics, keywords, or domains do not have to be predetermined, e.g., to label or identify the clusters. However, a custom language model generated for a user can be generated based on the clusters, and the custom language model can also inherently include the one or more topics/domains represented by the clusters.

Selecting Training Data

Figure 7:
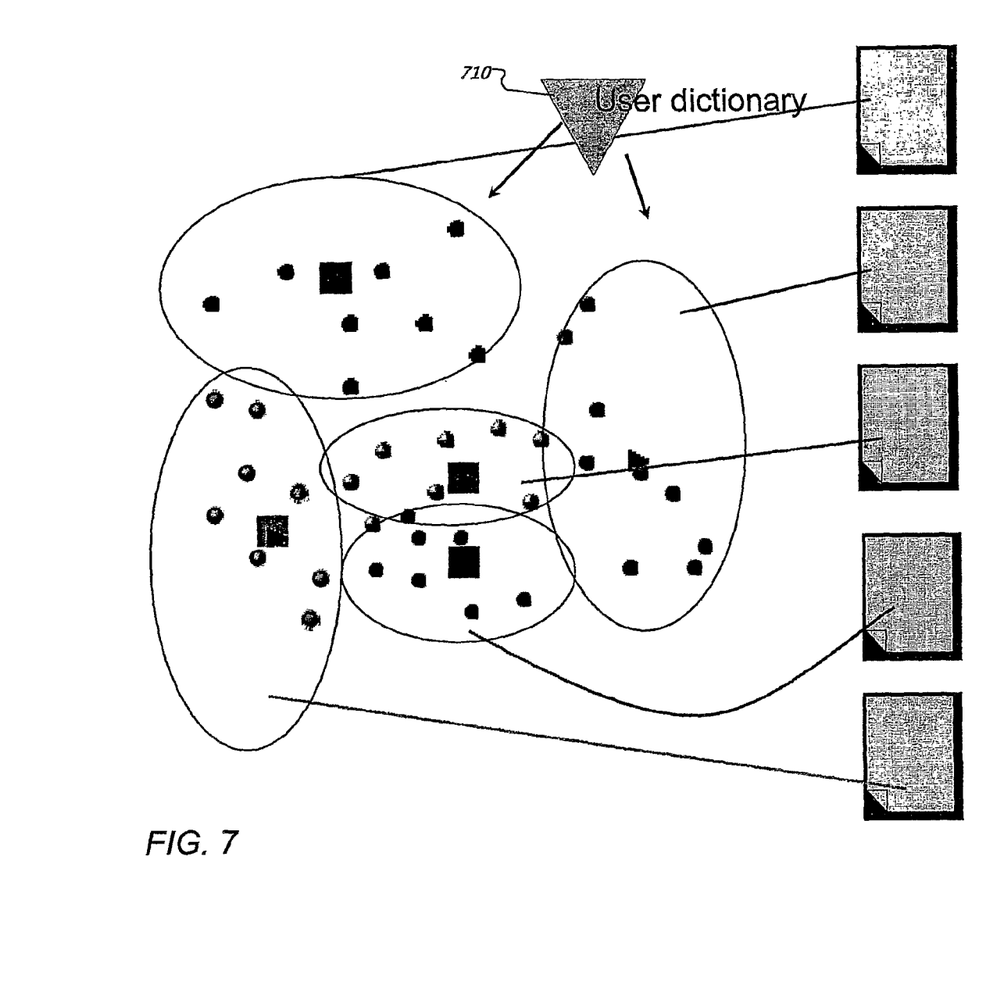
FIG. 7 is a diagram illustrating an example selection of one or more of the example clusters of FIG. 6.

FIG. 7 is a diagram illustrating an example selection of one or more of the example clusters of FIG. 6. In particular, clusters 510 and 520 are being selected based on a target profile from a user dictionary 710. As described previously, the target profile can be compared to the profiles of each cluster to determine a similarity between the target profile and each cluster profile.

In some implementations, a cosine similarity is calculated between the target profile and each cluster profile. The cosine similarity can be used to measure the similarity between two vectors. The cosine similarity can be expressed as:

$$\cos(x, y) = \frac{\sum_i x_i y_i}{\sqrt{\sum_i x_i^2} \sqrt{\sum_i y_i^2}},$$

where $x_i$ is a vector representing the target profile and $y_i$ is a vector representing a cluster profile. As the cosine similarity between two vectors approaches one, the two vectors become closer, or are more similar. The cosine similarity can be compared to a threshold value to determine if the cluster is selected. For example, if the cosine similarity is greater than a threshold value of 0.8, then x and y can be considered highly related with respect to a topic, and the cluster corresponding to y can be selected.

Generating a Custom Language Model

Figure 8:
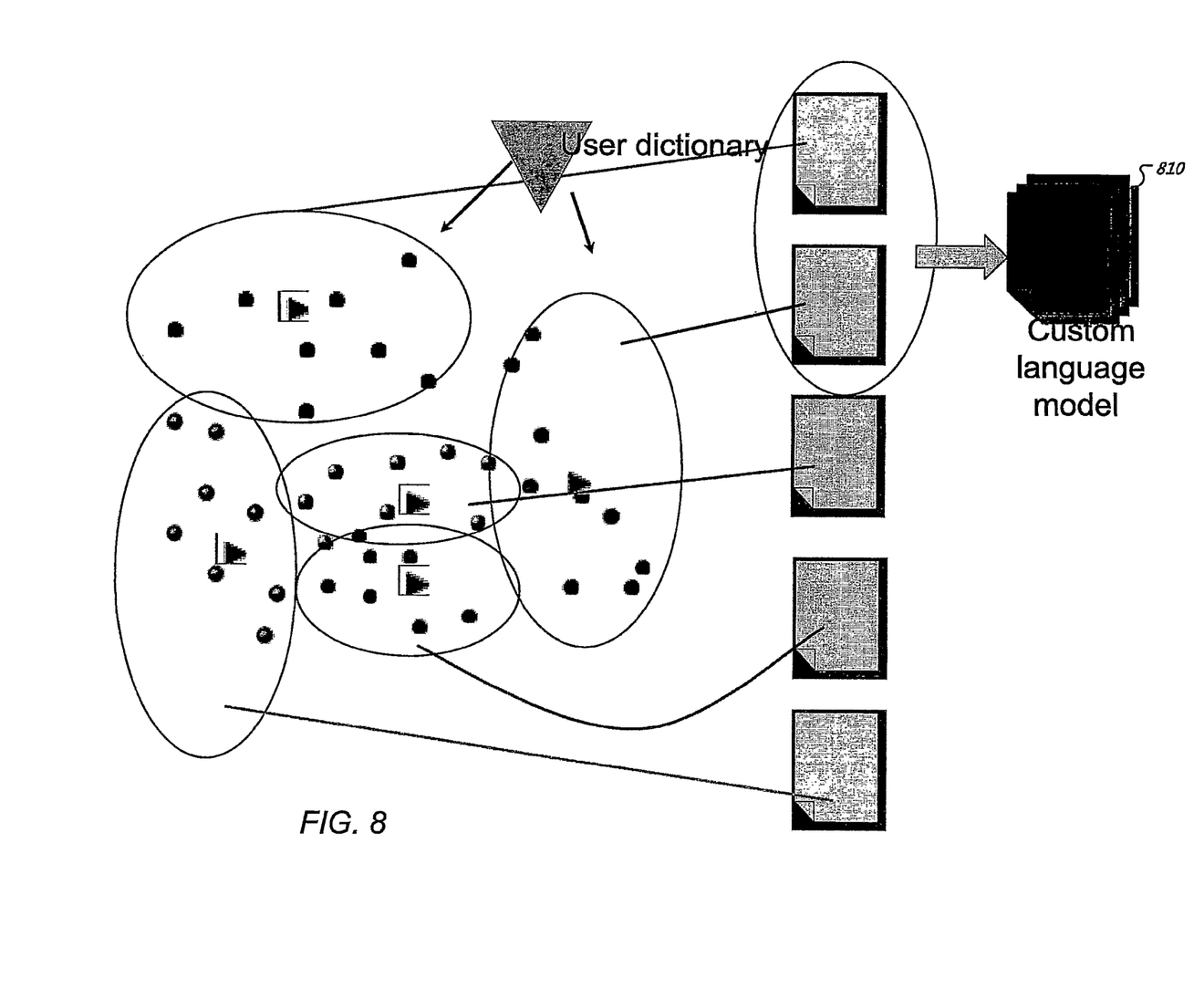
FIG. 8 is a diagram illustrating an example generation of a custom language model.

FIG. 8 is a diagram illustrating an example generation of a custom language model 810. The custom language model can be generated based on the documents in the selected clusters. The custom language model can include n-grams, and corresponding probabilities that the n-gram occur in the documents in the selected clusters.

The probability according to an n-gram language model that a particular string will occur can be determined using the chain rule. The chain rule determines a probability of a string as a product of individual probabilities. Thus, for a given string "$e_1, e_2, \ldots, e_k$", the probability for the string, $p(e_1, e_2, \ldots e_k)$, is equal to:

$$\prod_{i=1}^{k} p(e_i | e_1, \ldots, e_{i-1}).$$

The n-gram language model can be limited to a particular maximum size n-gram, e.g., limited to 1-grams, 2-grams, 3-grams, etc. For example, for a given string "NASA officials say they hope," where the maximum n-gram order is limited to 3-grams, the probability for the string can be determined as a product of conditional probabilities as follows: p(NASA officials say they hope) =p(NASA)·p(officials|NASA)·p(say|NASA officials)·p(they|officials say)·p(hope|say they). This can be generalized to:

$$p(e_1, \ldots, e_k) = \prod_{i=1}^{k} p(e_i | e_{i-n+1}, \ldots, e_{i-1}),$$

where n is the order of the largest n-gram allowed in the language model.

The conditional probabilities are generally determined empirically, according to relative frequencies in the documents of the selected clusters. For example, in the example above, the probability of the word "say" given the context of "NASA officials" is given by:

$$p(\text{say} | \text{NASA officials}) = \frac{f(\text{NASA officials say})}{f(\text{NASA officials})},$$

where f (NASA officials say) is a frequency or a count of the occurrences of the string "NASA officials say" in the documents of the selected clusters. Conditional probabilities for strings within the maximum n-gram order in the n-gram language model correspond to the probability stored in the language model for the n-gram, e.g., p(say|NASA officials) is the conditional probability stored in the language model for the 3-gram entry "NASA officials say".

Figure 9A:
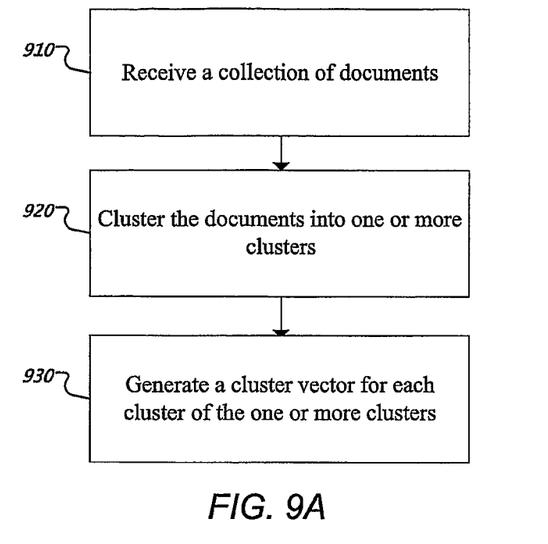
FIG. 9A is a flow chart showing an example process for generating a cluster vector.

FIG. 9A is a flow chart showing an example process for generating a cluster vector.

For convenience, the generation of the cluster vector will be described with respect to a system that performs the generation. A system receives 910 a collection of documents. For example, the server 120 can receive the training data 126. The system clusters 920 the documents into one or more clusters. For example, a classification engine (not shown) in the server 120 can cluster the documents. The system generates 930 a cluster vector for each cluster of the one or more clusters. For example, the classification engine in the server 120 can also generate a cluster vector for each cluster.

Figure 9B:
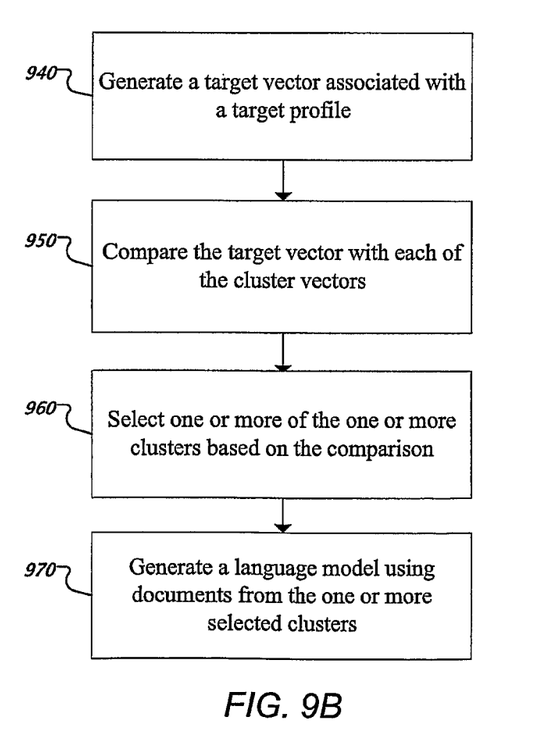
FIG. 9B is a flow chart showing an example process for generating a custom language model.

FIG. 9B is a flow chart showing an example process for generating a custom language model. For convenience, the generation of the custom language model will be described with respect to a system that performs the generation. The system generates 940 a target vector associated with a target profile. For example, the classification engine can generate a target vector associated with the target profile. The system compares 950 the target vector with each of the cluster vectors. For example, a comparison engine (not shown) in the server 120 can compare the target vector with each of the cluster vectors. The system selects 960 one or more of the one or more clusters based on the comparison, and generates 970 a language model (e.g., a custom language model) using documents from one or more selected clusters.

Although this specification illustrates many example n-grams as English words, embodiments of the subject matter and the functional operations described can be implemented for other languages (e.g., Chinese, Japanese, and Korean). For example, an n-gram can include one or more Chinese characters.

An electronic document (which for brevity was referred to as a document) does not necessarily correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a digital picture frame, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, at a computing device having one or more processors, a collection of documents;
   clustering, at the computing device, the documents into one or more clusters;
   generating, at the computing device, a cluster vector for each cluster of the one or more clusters;
   generating, at the computing device, a target vector associated with a target profile, the target profile being associated with an identified user;
   storing, at the computing device, the target profile;
   comparing, at the computing device, the target vector with each of the cluster vectors;
   selecting, at the computing device, one or more of the one or more clusters based on the comparison of the target vector with each of the cluster vectors; and
   generating, at the computing device, a custom language model for the identified user using documents from the one or more selected clusters.

2. The method of claim 1, where generating the custom language model includes:
   identifying, at the computing device, a collection of n-grams from the documents from the one or more selected clusters, each n-gram having a corresponding relative frequency of occurring in the documents from the one or more selected clusters.

3. The method of claim 1, where each cluster is associated with a topic or domain.

4. The method of claim 1, where each cluster vector represents a centroid for a corresponding cluster.

5. The method of claim 4, where clustering the documents includes:
   randomly assigning, at the computing device, each document to a cluster; and
   iteratively calculating, at the computing device, a centroid for each cluster and reassigning each document to a cluster based on a nearest centroid, until convergence.

6. The method of claim 1, where the target vector comprises a term frequency vector.

7. The method of claim 1, where the target vector is generated from at least one of a custom dictionary for the identified user or input from the identified user.

8. The method of claim 1, where the comparing includes:
   calculating, at the computing device, a cosine similarity between the target vector and each of the cluster vectors.

9. The method of claim 1, further comprising:
   receiving, at the computing device, one or more additional documents; and
   updating, at the computing device, the language model based on the one or more additional documents.

10. A computer-implemented method comprising:
    receiving, at a computing device having one or more processors, a user input identifying a user;
    identifying, at the computing device, a user profile corresponding to the user;
    using, at the computing device, the identified user profile to generate a user specific language model, including:
       receiving a collection of documents associated with the user,
       clustering the documents into one or more clusters,
       generating a cluster vector for each cluster of the one or more clusters,
       generating a target vector associated with the identified user profile,
       comparing the target vector with each of the cluster vectors,
       selecting one or more of the one or more clusters based on the comparison between the target vector and each of the cluster vectors, and
       generating the user specific language model for the user using documents from the one or more selected clusters; and
    sending, by the computing device, the user specific language model to a first client associated with the user.

11. The method of claim 10, further comprising:
    sending, by the computing device, the user specific language model to a second client.

12. The method of claim 10, where generating the user specific language model includes:
    identifying, at the computing device, a collection of n-grams from the documents from the one or more selected clusters, each n-gram having a corresponding relative frequency of occurring in the documents from the one or more selected clusters.

13. A computer program product, encoded on a non-transitory program carrier, operable to cause data processing apparatus to perform operations comprising:
    receiving a collection of documents;
    clustering the documents into one or more clusters;
    generating a cluster vector for each cluster of the one or more clusters;

generating a target vector associated with a target profile, the target profile being associated with an identified user;

comparing the target vector with each of the cluster vectors;

selecting one or more of the one or more clusters based on the comparison between the target vector and each of the cluster vectors; and generating a custom language model for the identified user using documents from the one or more selected clusters.

14. A system, comprising:

a non-transitory machine-readable storage device including a program product; and one or more computers operable to execute the program product and perform operations comprising:

receiving a collection of documents;

clustering the documents into one or more clusters;

generating a cluster vector for each cluster of the one or more clusters;

generating a target vector associated with a target profile, the target profile being associated with an identified user;

comparing the target vector with each of the cluster vectors;

selecting one or more of the one or more clusters based on the comparison between the target vector and each of the cluster vectors; and generating a custom language model for the identified user using documents from the one or more selected clusters.

* * * * *